US005694672A

United States Patent [19]

Perin

[11] Patent Number: 5,694,672

[45] Date of Patent: Dec. 9, 1997

[54] BOLT AND PIN EXTRACTION TOOL

[76] Inventor: Nolan A. Perin, 250 Green Meadow Ln., Pen Argyl, Pa. 18072

[21] Appl. No.: 579,947

[22] Filed: Dec. 28, 1995

Related U.S. Application Data

[60] Provisional application No. 60/006,090 Oct. 31, 1995.

[51] Int. Cl. 6 .......... B23P 19/00

[52] U.S. Cl. .......... 29/426.5; 29/254

[58] Field of Search .......... 29/254, 275, 426.5

[56] References Cited

U.S. PATENT DOCUMENTS

| | | | |
|---|---|---|---|
| 1,525,894 | 2/1925 | Seppmann . | |
| 1,873,294 | 8/1932 | Cosgrove . | |
| 2,450,293 | 9/1948 | Oserowsky | 29/254 X |
| 3,106,012 | 10/1963 | Cosmer | 29/254 |
| 3,358,352 | 12/1967 | Wilcox | 29/263 |
| 3,584,511 | 6/1971 | Collins | 29/254 X |
| 3,729,802 | 5/1973 | Lorenz | 29/254 |
| 3,757,409 | 9/1973 | Flanigan | 29/254 |
| 4,034,594 | 7/1977 | Morgan | 72/457 |
| 4,283,827 | 8/1981 | Abel | 29/254 |
| 4,335,493 | 6/1982 | Shivers, Jr. et al. | 29/253 |
| 4,364,440 | 12/1982 | Clar | 173/93.7 |
| 4,454,792 | 6/1984 | Burris | 29/254 X |
| 4,703,549 | 11/1987 | Grandt | 29/426.5 |
| 5,109,739 | 5/1992 | Hull et al. | 81/463 |
| 5,163,519 | 11/1992 | Mead et al. | 173/91 |
| 5,365,648 | 11/1994 | Fuga | 29/254 |
| 5,379,986 | 1/1995 | Perez et al. | 254/19 |

FOREIGN PATENT DOCUMENTS

| | | | |
|---|---|---|---|
| 2231478 | 5/1973 | France | 29/254 |
| 13974 | 8/1900 | United Kingdom | 29/275 |

*Primary Examiner*—S. Thomas Hughes

*Attorney, Agent, or Firm*—Dechert Price & Rhoads

[57] ABSTRACT

The invention provides a binding device extraction tool suitable for use in tight quarters that is made up of: (a) a coupling device for attaching an inertial impact tool for creating a force along a force axis; (b) a substantially cylindrical hollow gripping tube having a central axis parallel or co-extensive with a third axis that is orthogonal to the force axis; (c) a first slot having sufficient diameter to allow the insertion of the head of the binding device; and (d) a gripping slot positioned along a radial arc of the gripping tube, the gripping slot connected to the first slot and having dimensions suitable to allow the shaft of the binding device to slide from the first slot to the second slot so that the binding device is engaged at a curved surface of the gripping tube, wherein the diameter of the second slot is selected to grasp the head of the binding device, and wherein the binding device can be grasped with an angular offset between the binding device and the force axis. Preferably, the bolt can be grasped with an angular offset between the bolt or binding device and the attaching means central axis of between about 0° and about 45°.

16 Claims, 5 Drawing Sheets

BOLT AND PIN EXTRACTION TOOL

The present application claims the priority of U.S. Provisional application Ser. No. 60/06090, filed Oct. 31, 1995.

This invention relates to a tool for extracting (a) bolts or (b) comparable devices such as pins for holding two or more things together. The extraction tool of the invention is particularly suitable for use with a slide hammer or a comparable inertial impact device.

To remove the bolts with which the suspension arms of the undercarriage of an automobile are mounted, the nut attached to the bolt must first either be unscrewed or cut off. After this step, the more difficult task is to extract the bolt which can be bound in place by rust and the various forces that act on the suspension arm. Methods for extracting the bolt include hammering the threaded end of the bolt until it is flush with the suspension arm, and then further driving the bolt through the suspension arm using a drift pin. This method usually fails when the bolt has been partially extracted and has bent away from its original orientation due to uncompensated forces acting on the bolt. Another method has been to grasp the bolt head with a pair of vice-grip pliers and to impel the bolt outward by hammering on the pliers. This method is awkward and is economically irrational, since it creates great risk of damage to a pair of pliers having greater value than the bolt being extracted. These methods are often destructive to the bolt and the equipment surrounding the bolt, and the resulting destruction can further complicate the extraction process.

Slide hammers with various attachments have been used to extract bolts. Examples of such attachments can be found in U.S. Pat. Nos.: 4,034,594 (Morgan, see slide hammer attachment illustrated in FIG. 5); 3,106,012 (Comer, see slide hammer attachment of FIGS. 10–13); 5,163,519 (Mead et al., see slide hammer attachments of FIGS. 3 and 9); and 1,873,294 (Cosgrove, see slide hammer attachment of FIG. 2). None of these tools, however, are well suited for extracting a bolt with which an automobile suspension arm is mounted. This lack of suitability is because in the tight quarters in which one must approach such suspension arm mounting bolts there is often not enough room to maneuver these tools, which must slide over the bolt head with the extraction tool parallel with the bolt and at a right angle to the bolt head. Also, because of the geometry of these devices, the slide hammer must be oriented along the axis of the bolt, and this orientation is often not possible due to the tight quarters in which a bolt is situated.

With the present invention, the extraction tool can approach the bolt at an angle, such as a 45° angle relative to the axis of the bolt, allowing the grasping interaction to be initiated even when the bolt is situated in a cramped location. Also, the tool of the invention allows for the slide hammer, or other inertial impact device, to be operated at an angle offset from the axis of the bolt. By the present invention, extraction tools have been used at an angle offset from the axis of the bolt of as much as about 45°. Further offsets are possible using tools according to the invention.

SUMMARY OF THE INVENTION

The invention provides a tool for extracting a bolt or other binding device of dimensions suitable for extracting a bolt or binding device having a given bolt shaft diameter and a given bolt or binding device head diameter, the tool comprising: (a) an attaching means for attaching an inertial impact tool, the attaching means having a central axis; (b) a hollow gripping tube having a central axis parallel or co-extensive with an axis that is orthogonal to the central axis of the attaching means; (c) a first slot in the gripping tube of sufficient diameter to allow the insertion of the head of the bolt or binding device; and (d) a second slot connected to the first slot of dimensions suitable to allow the shaft of the bolt or binding device to slide from the first slot to the second slot, wherein the diameter of the second slot is selected to grasp the head of the bolt or binding device, and wherein the bolt or binding device can be grasped with an angular offset between the bolt or binding device and the attaching means central axis. In a preferred embodiment, the bolt or binding device can be grasped with an angular offset between the bolt or binding device and the attaching means central axis of between about 0° and about 45°.

The invention further provides a method of extracting a bolt or binding device with an inertial impact device comprising attaching the extraction tool of the invention to the bolt or binding device such that the head of the bolt or binding device is grasped by the grasping slot; and operating an inertial impact device attached to the extraction tool to apply outward force on the bolt or binding device. Preferably, the angular offset of the bolt and the tool is at least about 20°, more preferably 30°, yet more preferably 45°.

DETAILED DESCRIPTION

In describing the invention, reference is made to "grasping" a bolt head. In the context of this application, a bolt is grasped when the inner face of the bolt head is flush with the inner surface of bolt grasping slot 32 (or, in the case of a curved inner surface, as flush as possible) and the bolt head has a diameter greater than the width of bolt grasping slot 32.

Additionally, the terms "bolt", "bolt shaft", "bolt shaft diameter", "bolt head", "bolt head diameter" and the like shall be understood as referring to bolts, pins or other comparable binding or hinging devices.

Figure 1A:
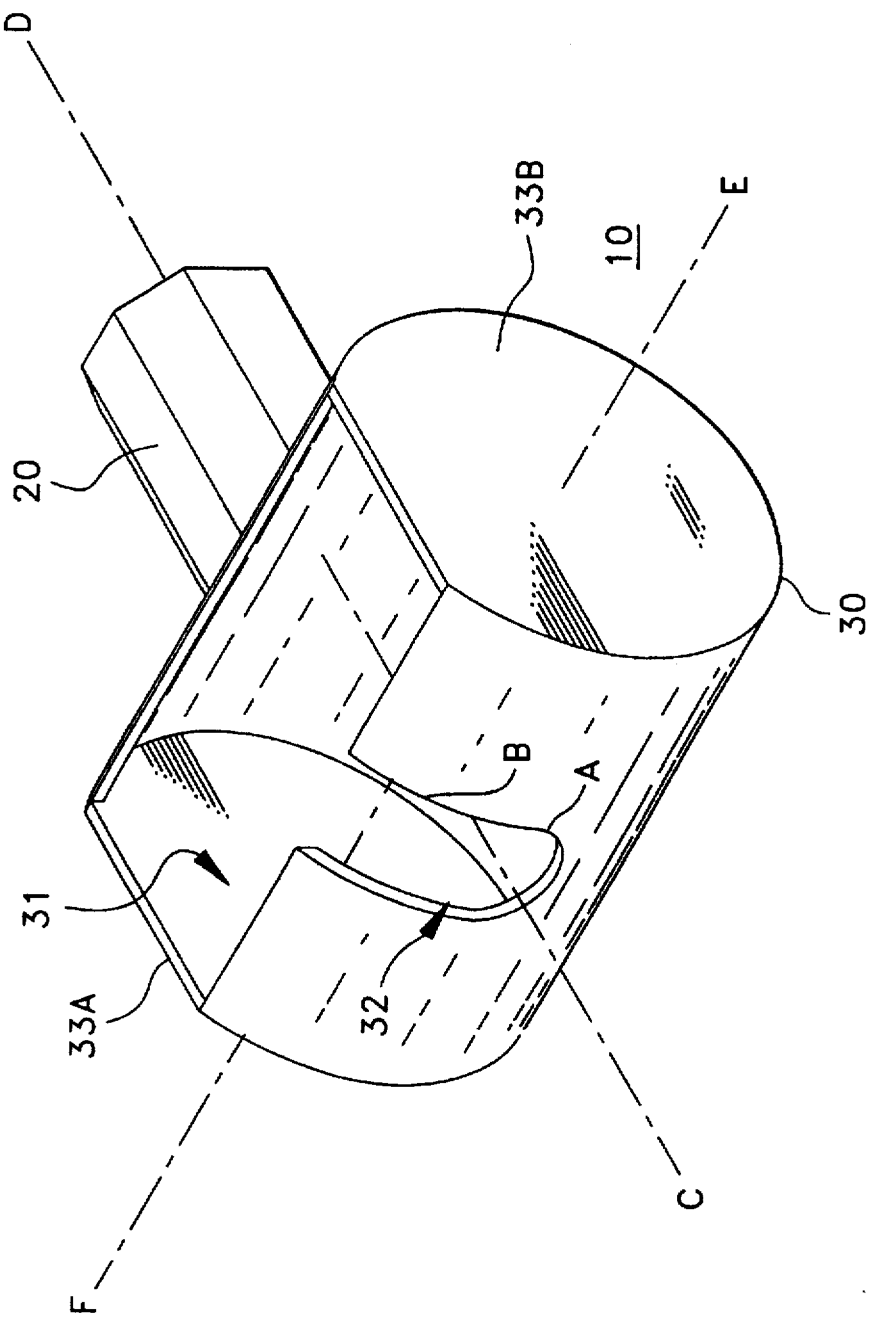
FIGS. 1A and 1B display perspective views of extraction tools according to the invention.

In FIG. 1, the attachment means 20 of extraction tool 10 is attached to gripping tube 30. The attachment means has a central axis C–D. This C–D axis shall be considered the axis of the extraction tool 10. The gripping tube 30 has a central axis E–F. Illustrated axis C–D is at a right angle to axis E–F. Gripping tube 30 has an entry slot 31 that is contiguous with a bolt grasping slot 32. As illustrated, gripping tube 30 has first side wall 33A and second side wall 33B. First side wall 33A and second side wall 33B are useful for adding strength to the tool. First side wall 33A and second side wall 33B need not be of solid construction; alternate geometries that also effectively strengthen the tool can usefully be employed. Positions A and B illustrate possible positions in slot 32 where a bolt head can be grasped.

Figure 2:
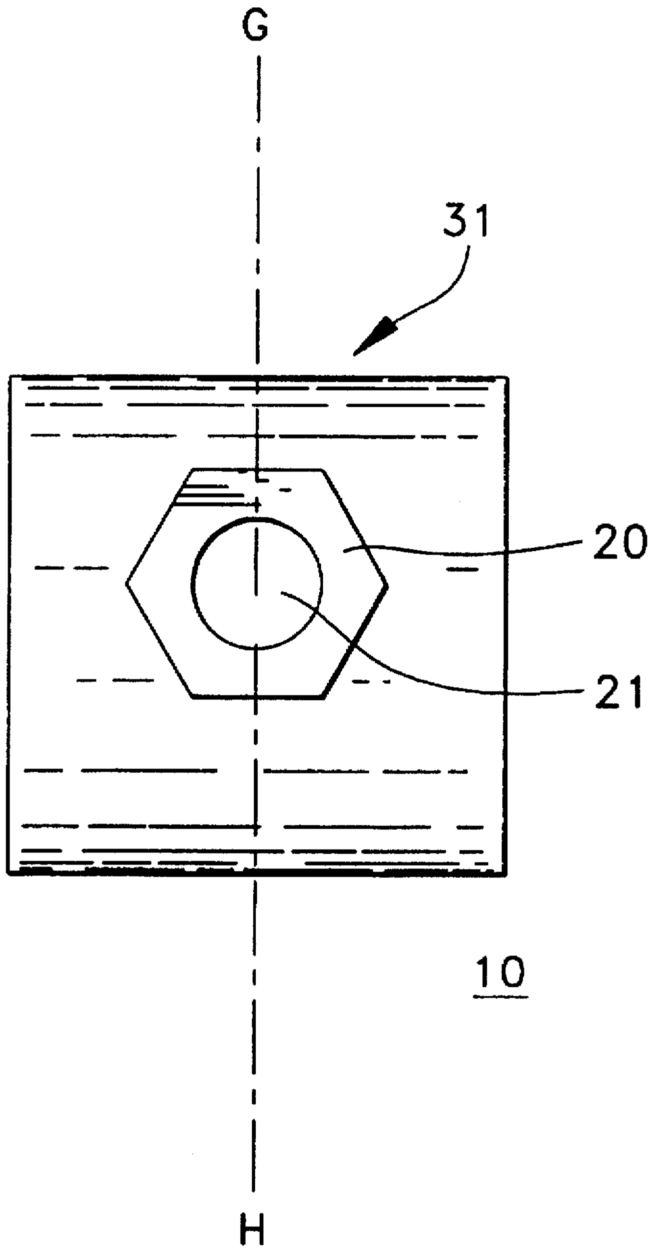
FIG. 2 shows a side view of the extraction tool of FIG. 1, showing tapped hole 21 into which a slide hammer can be screwed.

FIG. 2 is and end view of the extraction tool that shows the attachment means 20, and tapped hole 21 into which the threaded end of a slide hammer can be inserted (not shown).

Figure 3A:
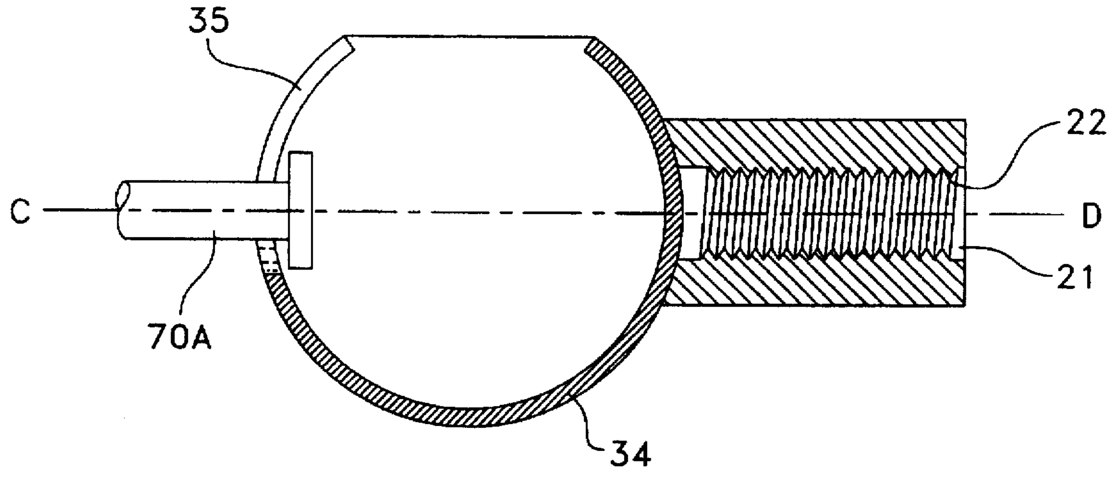
FIGS. 3A and 3B show a cut-away along the G-H axis shown in FIG. 2.
Figure 3B:
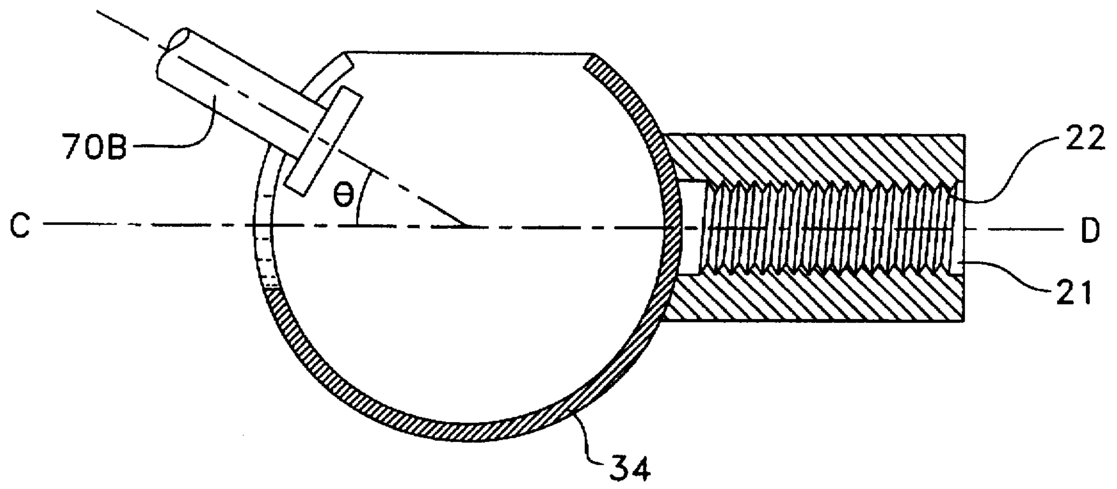

In FIGS. 3A and 3B are shown cut-aways along axis G–H shown in FIG. 2. Gripping tube wall 34 is that portion of gripping tube 30 that is not adjacent to bolt grasping slot 32. Gripping tube wall 35 is that portion of gripping tube 30 that is adjacent to bolt grasping slot 32. Tapped hole 21 contains threads 22. In FIG. 3A, first bolt 70A is shown grasped at position A. In FIG. 3B, second bolt 70B is shown grasped at position B. The angular offset θ of first bolt 70A and extraction tool 10 is 0°. The angular offset θ of second bolt 70B and extraction tool 10 is 30°.

Figure 4:
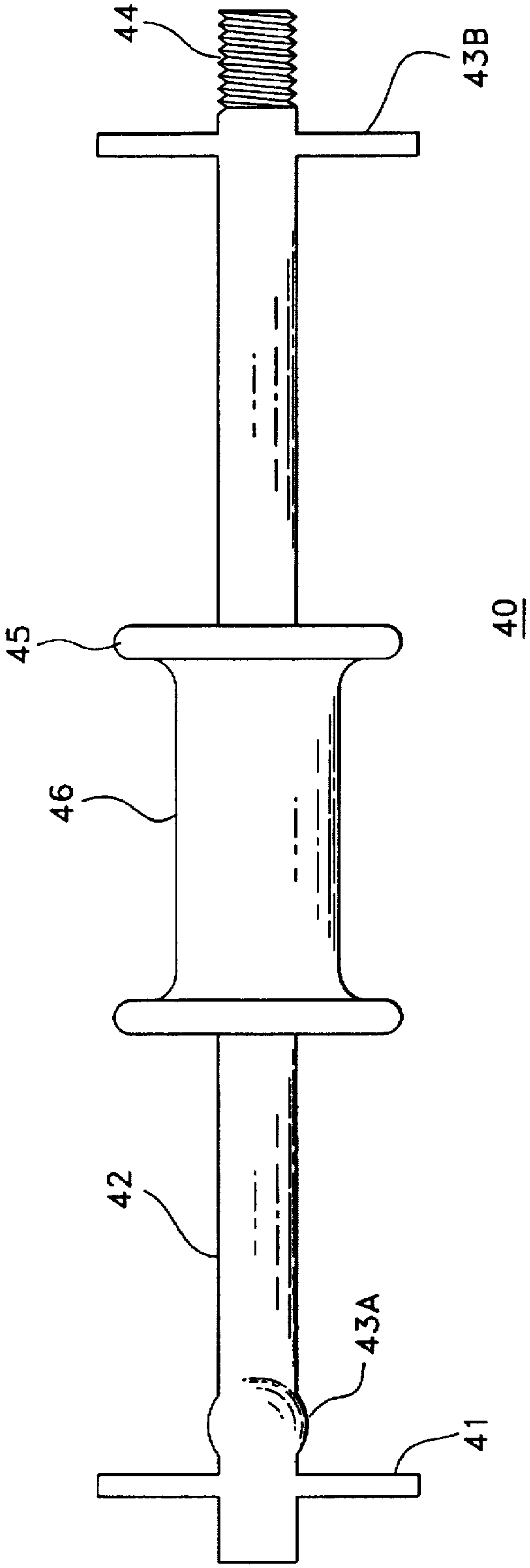
FIG. 4 shows a prior art slide hammer to which the extraction tool of the invention can be attached.

In FIG. 4, prior art slide hammer 40 has a handle 41, a shaft 42, a first stop device 43A, a second stop device 43B, a threaded end 44 for attaching an appropriate tool, and an inertial impact weight 45 that has a handle 46. In conjunction with the present invention, the slide hammer is operated by (a) grasping a bolt head with the extraction tool of the invention, (b) attaching the slide hammer to the tool (if not already attached), (c) moving inertial impact weight 45 to a position adjacent to second stop 43B, and (d) accelerating the inertial impact weight 45 towards first stop 43A. When the weight 45 impacts first stop 43A, the force of the impact is transferred to the bolt grasped by an attached extraction tool 10.

In a preferred embodiment, the extraction tool can grasp a bolt at an offset from the axis of the bolt of as much as about 30°, still more preferably as much as about 45°. It will be recognized that the illustrated entry slot 31 is substantially larger than needed to serve its function of allowing facile insertion of a bolt head into the gripping tube; smaller sizes can favorably be employed. Such smaller sizes can facilitate the construction of extraction tools that allow large angular offsets.

The gripping tube 30 is substantially cylindrical in shape. The phrase "substantially cylindrical" means that the shape of the tube is rounded adjacent to bolt grasping slot 32, as illustrated, allowing for an angular offset between a grasped bolt and the extraction tool 10. In some embodiments, the gripping tube 30 is fully cylindrical, meaning that all outer surfaces of the gripping tube 30 are cylindrical excepting areas that are cut away to form entry slot 31 and grasping slot 32.

Figure 1B:
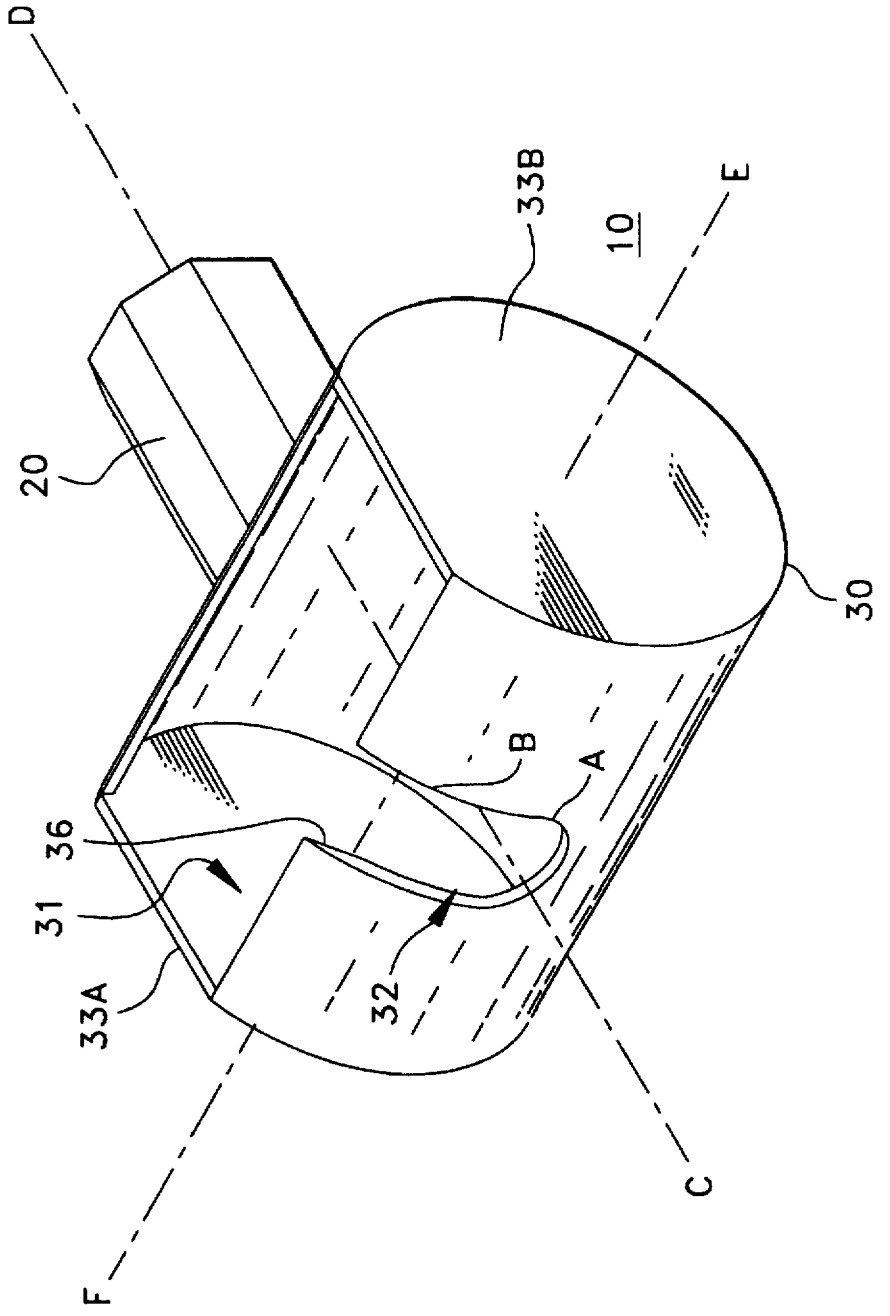

In a preferred embodiment, the sides of grasping slot 32 at the junction with entry slot 31 are wedge-shaped, as illustrated in FIG. 1B with the wedge 36 formed by cutting away part of the inner surface of the gripping cylinder. Of course, the phrase "cutting away" is intended to describe the geometry of the wedge; in fact, it can be directly formed by a casting process. The wedge facilitates fitting the extraction tool onto the bolt head of a bolt that is to be extracted. Generally, the wedge is formed so that the side walls forming grasping slot 32 thicken as the distance from entry slot 31 increases. Preferably, the wedged portion of the side walls extends no more than about 3/16 inch from entry slot 31.

The extraction tool can be manufactured from common hardware devices. For instance, the attachment means 20 is fabricated by welding two equivalently sized hardened nuts together. To assure that the threading of the nuts will remain aligned, the nuts should be welded together while both are temporarily screwed onto the same bolt. Nonetheless, it is generally useful to re-tap the threads to assure smooth alignment. The attachment means 20 is welded to a piece of tubing, for instance a piece of tubing of 1½ inch length and 1½ inch diameter, that will form the gripping tube 30. Entry slot 31 can then be cut into the tubing using a plasma torch or a saw. To strengthen the tool, 1½ inch (outside diameter) washers are welded to the ends of the tubing to form first and second side walls 33A and 33B, respectively. Finally, grasping slot 32 is cut into the tubing using a drill to radius (i.e., round) the bottom of the slot and a saw to cut the sides of the slot.

Preferably, the extraction tool 10 is formed using a casting technique. To facilitate casting, it may be necessary to cast the tool without one or both of first and second side walls 32A and 32B, respectively, which can then separately be bonded to the tool 10. Other procedures for casting the tool in parts to accommodate geometrical constraints will be recognized by those of ordinary skill in the tool making arts. Extraction tool 10 can be formed of any material that will result in a tool of sufficient strength for use in a particular field. Preferably, the extraction tool is metallic, most preferably formed of a steel alloy or another metal of comparable strength. In a particularly preferred embodiment, the extraction tool 10 is formed of chrome-moly steel (a steel alloy typically containing, by weight, between about 0.28% and about 0.33% carbon, between about 0.40% and about 0.60% manganese, between about 0.20% and about 0.35% silicon, between about 0.80% and about 0.11% chromium, between about 0.15% and about 0.25% molybdium, no more than about 0.035% phosphorus and no more than about 0.4% sulfur) such as 41/30 chrome-moly steel. The thickness of the walls of gripping tube 30 is selected after taking into account the strength suitable for a particular application and the advantage derived from having a thin thickness of the walls surrounding the bolt grasping slot 32, which thinness facilitates fitting the tool over the head of a bolt.

Preferably, the face of the extraction tool 10 at bolt grasping slot 32 is flush with the outer face of the grasping slot 32, to facilitate fitting the tool over the head of a bolt.

In the United States, slide hammers typically have 5/8 inch and ½ inch shafts. Thus, for use in the United States, the extraction tool will favorably be designed to fit one or the other of these sized slide hammers. Other sizes will generally be used for extraction tools manufactured for foreign markets. An extraction tool having a bolt grasping slot 32 of 5/8 inch width is suitable for extracting 7/16, 3/8, ½, 9/16 and 5/8 inch bolts. An extraction tool having a bolt grasping slot 32 of 7/8 inch width is suitable for extracting 5/8, ¾ and 7/8 inch bolts.

It will be recognized that, while the cramped working conditions involved in extracting automobile suspension bolts gave rise to the present invention, the tool of the invention is conveniently applied in many contexts. The extraction tool of the invention is more facilely fitted over bolts even where there are no substantial space constraints.

What is claimed is:

1. A tool for extracting a binding device, the tool having dimensions suitable for extracting a binding device having a given shaft diameter and a given head diameter, the tool comprising:

(a) a coupling device for attaching an inertial impact tool for creating a force along a force axis;

(b) a substantially cylindrical hollow gripping tube having a central axis parallel or co-extensive with a third axis that is orthogonal to the force axis;

(c) a first slot having sufficient diameter to allow the insertion of the head of the binding device; and (d) an elongate gripping slot longitudinally co-extensive with and positioned along a radial arc of the gripping tube, the gripping slot connected to the first slot and having dimensions suitable to allow the shaft of the binding device to slide from the first slot to the gripping slot so that the binding device is engaged at a curved surface of the gripping tube, wherein the diameter of the gripping slot is selected to grasp the head of the binding device, and wherein the binding device can be grasped with an angular offset between the binding device and the force axis.

2. The extraction tool of claim 1, wherein the binding device can be grasped with an angular offset between the binding device and the force axis of between about 0° and about 30°.

3. The extraction tool of claim 1, wherein the binding device can be grasped with an angular offset between the binding device and the force axis of between about 0° and about 45°.

4. The extraction tool of claim 1, wherein the first and gripping slots are of appropriate size for the extraction of a binding device having a shaft with a diameter between about ⅜ inch and about ⅝ inch.

5. The extraction tool of claim 1, wherein the first and gripping slots are of appropriate size for the extraction of a binding device having a shaft with a diameter between about ⅝ inch and about ⅞ inch.

6. The extraction tool of claim 1, wherein the coupling device and gripping tube are fabricated together using a casting process.

7. The extraction tool of claim 1, wherein the gripping tube is cylindrical.

8. The extraction tool of claim 1, wherein the gripping slot, at the junction with the first slot, has wedge-shaped sides.

9. A method of extracting a binding device with an inertial impact device comprising providing an extraction tool, wherein the extraction tool comprises:
- (i) a coupling device for attaching an inertial impact tool for creating a force along a force axis;
- (ii) a substantially cylindrical hollow gripping tube having a central axis parallel or co-extensive with a third axis that is orthogonal to the force axis;
- (iii) a first slot having sufficient diameter to allow the insertion of the head of the binding device; and
- (iv) an elongate gripping slot longitudinally co-extensive with and positioned along a radial arc of the gripping tube, the gripping slot connected to the first slot and having dimensions suitable to allow the shaft of the binding device to slide from the first slot to the gripping slot so that the binding device is engaged at a rounded surface of the gripping tube, wherein the diameter of the gripping slot is selected to grasp the head of the binding device, and wherein the binding device can be grasped with an angular offset between the binding device and the force axis;

positioning the gripping slot to thereby grip the binding device so that the binding device is engaged at said rounded surface of the gripping tube;

operating an inertial impact device attached to the extraction tool thereby applying an outward force along the force axis on the binding device.

10. The method of claim 9, wherein the angular offset between the binding device and force axis is at least about 20°.

11. The method of claim 9, wherein the angular offset between the binding device and force axis is at least about 30°.

12. The method of claim 9, wherein the angular offset between the binding device and force axis is at least about 45°.

13. A tool for extracting a binding device, the tool having dimensions suitable for extracting a binding device having a given shaft diameter and a given head diameter, the tool comprising:
- (a) a coupling device for attaching an inertial impact tool for creating a force along a force axis;
- (b) a hollow gripping tube having a central axis parallel or co-extensive with a third axis that is orthogonal to the force axis;
- (c) a first slot in the gripping tube having sufficient diameter to allow the insertion of the head of the binding device; and
- (d) an elongate gripping slot in the gripping tube,
  - wherein the gripping slot is connected to the first slot and has dimensions suitable to allow the shaft of the binding device to slide from the first slot to the gripping slot so that the binding device is engaged at a rounded surface of the gripping tube, and wherein the diameter of the gripping slot is selected to grasp the head of the binding device, and
  - wherein further the gripping tube is substantially cylindrical and the gripping slot substantially longitudinally co-extensive with and positioned along a radial arc of the gripping tube so that the binding device can be grasped with an angular offset between the binding device and the force axis.

14. The extraction tool of claim 13, wherein the angular offset between the binding device and the force axis is at least about 20°.

15. The extraction tool of claim 13, wherein the angular offset between the binding device and the force axis is at least about 30°.

16. The extraction tool of claim 13, wherein the angular offset between the binding device and the force axis is at least about 45°.

* * * * *